Patented Feb. 11, 1941

2,230,995

UNITED STATES PATENT OFFICE 2,230,995

LARVICIDE AND INSECTICIDE AND METHOD OF PRODUCTION THEREOF

Narayan Annappa Balvalli, Bombay, British India, assignor of one-half to F. S. Kerr & Company, Bombay, British India, a proprietary concern No Drawing. Application January 22, 1938, Serial No. 186,471. In British India December 10, 1937

7 Claims. (Cl. 167—24)

This invention relates to the preparation of cardol from cashew nuts and to novel uses thereof, particularly although not essentially as a larvicide or insecticide.

It is well known that the constituents of cashew nut shell oil are anacardic acid and a non-acidic substance called cardol, the exact composition of which has not been accurately determined and to which some chemists give the formula $C_{32}H_{41}O_4$ and others the formula $C_{32}H_{50}O_3$, and attempts have been made in the study of cashew nut shell oil to determine the exact composition and properties of the cardol and to separate the same from the anacardic acid.

A method hitherto proposed for separating the cardol from the cashew nut shell oil consists in precipitating anacardic acid by freshly precipitated lead hydroxide in alcohol as a medium, but such method has proved to be both complicated and costly.

One object of the present invention is to provide an improved method of extracting cardol from cashew nuts, i. e. of separating the same from the anacardic acid, which is more simple and less costly than the method heretofore proposed, and which may be effected either by direct treatment of the cashew nuts themselves (raw or roasted) or by treatment of the cashew nut shell oil, after extraction of the latter from the nuts.

In carrying the same into practice, the method according to the invention for obtaining cardol as an extraction from cashew nuts (i. e. from cashew nut shells or from cashew nut shell oil), which cardol may be used as hereinafter described particularly although not essentially in a larvicidal or insecticidal mixture, consists in subjecting the material to be treated (i. e. the crushed nuts or the oil) to the action of a chemical compound adapted to form a salt of the anacardic acid and which is capable of taking the salt thus formed into solution, and then separating the cardol from the said mixture by means of a solvent which is immiscible with the solvent holding the said anacardic salt formed.

The said chemical compound may be an hydroxide, carbonate or bicarbonate of any one or all of the alkali or alkaline earth metals, or of ammonium, or any soluble salt of a strong base and a weak acid.

In one form of such method according to the present invention, cashew nut shell oil may be treated first with a solution of a caustic alkali, which takes into solution the salt of the anacardic acid, and the cardol be separated from this mixture by agitation with petrol or any other solvent which is immiscible with water.

Preferably, there is added to the cashew nut shell oil an aqueous solution of caustic alkali which is in excess of the quantity required to neutralize the anacardic acid in the oil, the said mixture is heated and then allowed to cool, a solvent, such as petrol, which is immiscible with water, is added to the said mixture to dissolve the cardol, the layer of cardol-solvent solution thus formed is thereafter separated from the remainder and subjected, if desired, to a purification treatment by a dehydrating agent, and the cardol is finally separated from the petrol or other solvent.

In another form of such method according to the invention, the crushed cashew nut shells themselves may be treated with a slight excess of an hydroxide, carbonate or bicarbonate of an alkali metal or ammonium hydroxide to saponify the anacardic acid, and the whole mass mixed with a solvent immiscible with water which takes the cardol in solution and from which it is thereafter separated by suitable treatment.

Preferably, in such other form of the method according to the invention, the cashew nut shells (either raw or roasted) are crushed and heated with an excess of hydroxide, carbonate or bicarbonate of an alkali metal, or ammonium hydroxide, based on the anacardic acid content in the oil of the shells, to saponify the anacardic acid, the mixture is then allowed to cool, and is thereafter mixed with a solvent immiscible with water so as to form a top layer of the solvent (immiscible with water) and cardol and a bottom layer containing water, the salt of the anacardic acid and the crushed shells, the said top layer being thereafter separated from the bottom layer, filtered and the cardol separated from the filtrate.

The above describes novel methods of preparation of the chemical compound known as cardol from cashew nuts, but the invention also contemplates, not only such novel methods of preparation of the cardol, but also novel uses of the compound, however prepared, and particularly the use thereof as a larvicide or insecticide.

Larvicides and insecticides are known prepared for use as household insecticides, livestock sprays, horticultural sprays, mosquito larvicides and for other purposes, but especially those that are to be used in the form of emulsions, have the disadvantages that they readily separate into layers and furthermore require to be used in relatively large quantities to provide the required killing efficacy. Such insecticides and larvicides have generally for bases one or more hydrocarbon oils, which even if used alone, in sufficient quantities, will operate efficiently, but are generally mixed with a further toxic substance to form the above described emulsions having enhanced killing efficacy, but with the disadvantages referred to.

In view, however, of the extensive and important uses of insecticidal and larvicidal mixtures it is essential that the emulsions should retain their correct form and have the maximum killing efficacy while possessing at the same time the advantages of relatively low cost and facility of preparation when being put into use.

It is therefore another object of the present invention to provide an improved composition of insecticide and larvicide, and a method of producing the same, which composition has even higher killing power than the mixtures previously prepared, is readily prepared for use, is of relatively low cost and furthermore has the advantage that the constituents thereof retain their correct form of admixture.

To this end, it has also been found that the said compound known as cardol is itself an active principle as a larvicide and insecticide and the invention therefore also comprises an improved larvicidal or insecticidal composition consisting of the said chemical compound known as cardol in admixture with a suitable vehicle medium capable of acting as a spreading medium. It has been found that the presence of the vehicle medium is necessary as if the cardol is used by itself as a larvicide or insecticide and is applied by itself to the breeding areas, for example, it does not spread but only those larvae and pupae that are caught in the blotches are killed.

The invention further comprises broadly the method of preparing a larvicidal or insecticidal composition which consists in extracting the chemical compound known as cardol by suitable treatment of the cashew nut and admixing the same with a vehicle medium capable of acting as a spreading medium for the mixture.

Preferably, an improved larvicidal or insecticidal composition according to the present invention consists of the chemical compound known as cardol in admixture with one or more hydrocarbon oils, such as kerosene or high speed Diesel oil, with or without the addition of further spreading media such as one or more aromatic hydrocarbons and/or vegetable oils. The said cardol may be used in admixture with the hydrocarbon oil or oils in the strength of 0.3% by volume or more.

It will be understood that in the improved larvicidal or insecticidal composition according to the invention the cardol is used separate from the other constituents to be found in cashew nut shell oil, and particularly from the other main constituent which is anacardic acid. Up to the present time cardol is only known as an extraction to be obtained from cashew nuts, but should it be found subsequently to be obtainable from any other source then such further source may also be used to supply the cardol for a larvicidal or insecticidal composition according to the present invention.

In order that the invention may be more clearly understood, two specific methods of preparing cardol from cashew nuts and the application of the cardol so prepared to the production of a larvicide or insecticide will now be described, by way of example only.

*Example I*

100 grams of cashew nut shell oil are taken in a 1000 cc. beaker and to this an aqueous solution (12–16 grams in 50 grams of water) of caustic soda, which is well in excess of the quantity required to neutralize the anacardic acid in the oil, is added. The mixture is heated for 2 to 2½ hours over a water bath and is allowed to cool down to room temperature (approximately 28° C.). A thick jelly is formed, consisting of a mixture of sodium anacardate and caustic soda solutions and cardol. About 900 cc. of petrol (5–6 times the volume of the mixture) is then added to the jelly and the whole is agitated thoroughly until the jelly breaks up into small particles. On allowing the same to settle for five hours, the cardol dissolved in the petrol which forms a clear top layer over a turbid chocolate colored layer of the aqueous solution of sodium anacardate and the excess of alkali. Between the two layers a thin layer is usually formed which consists of all the constituents of the mixture and which may be treated separately for the isolation of its cardol content. The layer of cardol-petrol solution is separated either by pumping or by tapping off the two lower layers. Any traces of water and sodium anacardate in this solution are separated by agitating it with a dehydrating agent, such as calcium chloride. On allowing the same to settle, a clear layer of cardol-petrol solution separated at the top which is removed and distilled under reduced pressure to separate the cardol from the petrol.

*Example II*

In the second method of producing the cardol, the latter is extracted directly from the cashew nut shells, either raw or roasted.

The advantage of this method over the previously described method i. e. the separation of the cardol from the shell oil, is that it eliminates the first stage of separating the oil from the shells and consequently saves labor and solvents. Here again, however, advantage is taken in this second method of the immiscibility of the solvent used, in water.

The shells, raw or roasted, are first crushed and a slight excess of hydroxide, carbonate or bicarbonate of any one or of all of the alkali metals or ammonium hydroxide based on the anacardic acid content in the oil in the raw shells (about 30–40% oil in the raw shells) and in the oil (28–30%) in the roasted shells, is dissolved in water sufficient (about 3 times the weight of the shells), to sink all the crushed shells, and the whole is boiled for about 3–3½ hours to completely saponify the anacardic acid. The whole mass is allowed to cool to room temperature (about 27° to 29° C.). The mass is then mixed and agitated thoroughly with either petroleum ether or a 1.1 mixture of ether sulphuric and petrol, benzol or any other solvent immiscible with water and then allowed to stand for about 5–7 hours when the mass separates into two distinct layers; a top layer of the solvent (immiscible with water) containing cardol and a bottom layer of water containing sodium, potassium or ammonium salt (as the case may be) of anacardic acid and the crushed husks or shells and a small percentage of the top layer. The top layer is separated and stirred with 0.2 to 0.5% of kieselguhr or any other filter aid and is filtered. The cardol remains in the filtrate in solution with the solvent and is separated by distillation or evaporation under reduced pressure.

In a specific case of such second method 62.48 grams of crushed shells may be taken in a beaker and mixed with a solution of caustic soda (2.5 grams of caustic soda in 180 cubic centimeters of water) and the whole be boiled over a water bath for about 3½ hours. The whole mass is then allowed to cool to 27° C. and mixed with about 600 cubic centimeters of 1.1 mixture of ethyl ether and ordinary petrol and thoroughly stirred. On allowing to stand for about 5 hours, the mixture separates into two layers; a top layer of ether petrol mixture containing cardol and a lower layer of sodium anacardate, water, crushed husks and a very small percentage of the top layer. The top layer may then be removed in another beaker and about 0.2% of kieselguhr thoroughly stirred with it and then filtered. The other filtrate is then freed from cardol by distillation and the last traces of petrol removed by distillation under reduced pressure.

Cardol when prepared by the method according to the invention described above with reference to the two examples given may have a variety of uses. It has been found, however, to possess marked properties as a larvicide or insecticide, which has not only substantially higher killing efficacy than the larvicidal and insecticidal mixtures hitherto proposed, but also operates more rapidly, although to operate efficiently, due to its non-spreading properties, it must be mixed with a suitable vehicle medium such as an hydrocarbon oil, capable of acting as a spreading medium for the mixture, and also in some cases, of adding to the killing power of the mixture.

Thus, for example, the cardol itself has larvicidal properties, but if applied directly over the breeding areas to be destroyed it would not spread and only those larvae and pupae that are caught in the blotches would be killed. On exposure to air it forms a thick scum which loses its larvicidal properties. According to the invention there are therefore prepared mixtures of the cardol with hydrocarbon oils or coal tar oils, particularly kerosene, high speed Diesel oil, light Diesel oil and fuel oil, in strengths of 0.3% by volume or more for laboratory conditions and 0.5% or more for field conditions, with or without the addition of a spreading medium such as one or more aromatic hydrocarbons and/or vegetable oils. These mixtures are prepared by taking the solvent containing the cardol and evaporating the same under reduced pressure to remove the bulk of the solvent which can be used again. When the volume has been reduced to nearly twice or slightly less the amount of the cardol, kerosene, high speed Diesel oil, light Diesel oil, fuel oil, or the like is added in the ratio of 0.3 cardol to 99.7 of the oil less the quantity of the solvent. This produces larvicidal mixtures in which the toxic principle is the cardol but which due to the oil vehicle will no longer form a thick scum which loses its larvicidal properties but on the contrary have the toxicity thereof preserved. The larvicidal mixtures in use, may be sprayed at the rate of 1 cc. per sq. ft. of breeding area to obtain 100% kill of larvae and pupae. The said mixtures are free from the disadvantages of cardol as used alone, have greater spreading power and are more economical. They also form a continuous film over the surface of the area and penetrate the respiratory tubules of the larvae and pupae better than cardol by itself which is a thick and very viscous liquid.

It will be seen from the above that by means of the invention not only can the chemical compound known as cardol be extracted from cashew nuts in the simplified, inexpensive and convenient manner above described, but also a larvicidal or insecticidal composition may be obtained by addition to a suitable vehicle medium or to a hydrocarbon oil as previously used, of a much smaller quantity of a toxic substance than has hitherto been possible, and employing a new toxic substance never hitherto used for such purpose and having enhanced efficacy as a larvicide or insecticide, thus resulting in a mixture of an entirely new composition and increased efficacy.

The larvicide or insecticide according to the invention including cardol prepared by either one of the two methods above described has been found to have not only substantially higher killing efficacy than the mixture hitherto proposed but also to operate more rapidly. For example, if a larvicidal or insecticidal mixture according to the invention is sprayed at the rate of 1 cc. per sq. ft. of breeding area it has been found effective in giving a 100% kill of larvae and pupae, anapheline larvae and pupae dying earlier than the culex species and with the destruction of the former taking only from 15 to 30 minutes and that of the latter only from 2 to 2½ hours.

It will be understood that the invention is not restricted to the specific details thereof which have been given above, by way of example only.

I claim:

1. A pest-control composition useful as a larvicide and insecticide consisting of the chemical compound called cardol, obtained as the residue after separating out the anacardic acid content of cashew nut shell liquid, in admixture with a liquid hydrocarbon vehicle medium which is in a quantity sufficient to prevent the cardol from being oxidised by the air, whereby to preserve the toxicity thereof, and which also acts as a spreading medium for the cardol.

2. A larvicide consisting of the chemical compound called cardol, obtained as the residue after separating out the anacardic acid content of cashew nut shell liquid, in admixture with a liquid hydrocarbon vehicle medium which is in a quantity sufficient to prevent the cardol from oxidation by the air, thereby to preserve the toxicity of the same, and which also acts as a diluent and spreading medium for the cardol, the said larvicide being sprayable over mosquito breeding areas in the order of about 1 c. c. per square foot of area to be sprayed, and the admixture used in such relative proportion being toxic to larvae and pupae without injury to aquatic plants but the quantity of liquid hydrocarbon vehicle contained in the mixture as used per square foot of sprayed area being insufficient to have any appreciable toxic action by itself on the larvae and pupae.

3. A larvicide consisting of the compound toxic to larvae and pupae obtained by transforming anacardic acid in cashew nut shell liquid into a salt by means of a chemical compound which also takes the said salt into solution and then separating out the residual compound containing the toxic principle by means of a solvent which is immiscible with the solvent holding the anacardic salt and evaporating the said solvent from the said toxic compound, the said toxic compound being admixed with a liquid hydrocarbon vehicle medium which is in a quantity sufficient to prevent oxidation of the said toxic principle by the air and thereby loss of toxicity of the same and which also acts as a spreading medium for the said toxic principle.

4. A pest-control composition useful as a larvicide and insecticide according to claim 1, wherein the cardol is admixed with a hydrocarbon oil in a percentage of at least 0.3 by volume.

5. A pest-control composition useful as a larvicide and insecticide according to claim 1 having included therein a spreading medium in the form of a vegetable oil.

6. The method of preparing, as an extraction from cashew nuts, a compound which is toxic to insects and larvae and pupae, which comprises subjecting base material containing cashew nut shell liquid which includes anacardic acid to the action of a chemical compound adapted to form a salt of the anacardic acid and which is capable of taking the salt thus formed into solution, separating out therefrom the residual compound which forms the toxic principle by means of a solvent which is immiscible with the solvent holding the anacardic salt, and then evaporating at least partially the said solvent from the toxic compound.

7. The method of preparing a pest-control composition useful as a larvicide and insecticide, which comprises subjecting base material containing cashew nut shell liquid which includes anacardic acid to the action of a chemical compound adapted to form a salt of the anacardic acid and which is capable of taking the salt thus formed into solution, separating out the residual compound containing the toxic principle by means of a solvent which is immiscible with the solvent holding the anacardic salt, evaporating at least partially the said solvent from the toxic compound, and then admixing the said toxic compound with a liquid hydrocarbon vehicle medium in a quantity which will prevent oxidation of the toxic principle by the air and thereby prevent loss of toxicity of the same.

NARAYAN ANNAPPA BALVALLI.